(12) United States Patent
Eglington et al.

(10) Patent No.: US 7,451,030 B2
(45) Date of Patent: Nov. 11, 2008

(54) SYSTEM AND METHOD FOR INTERACTIVE SELECTION AND DETERMINATION OF AGRICULTURAL VEHICLE GUIDE PATHS OFFSET FROM EACH OTHER WITH VARYING CURVATURE ALONG THEIR LENGTH

(75) Inventors: Michael Eglington, San Francisco, CA (US); Michael L. O'Connor, Redwood City, CA (US); Lars G. Leckie, San Francisco, CA (US); Glen A. Sapilewski, Redwood City, CA (US)

(73) Assignee: Novariant, Inc., Menlo Park, CA (US)

( * ) Notice: Subject to any disclaimer, the term of this patent is extended or adjusted under 35 U.S.C. 154(b) by 476 days.

(21) Appl. No.: 11/051,490

(22) Filed: Feb. 4, 2005

(65) Prior Publication Data

US 2006/0178825 A1    Aug. 10, 2006

(51) Int. Cl.
*G01C 22/00* (2006.01)
*G05D 1/00* (2006.01)
*G06F 7/70* (2006.01)

(52) U.S. Cl. .................. 701/50; 701/209; 701/211; 701/25

(58) Field of Classification Search .............. 701/208, 701/211, 50, 25, 209
See application file for complete search history.

(56) References Cited

U.S. PATENT DOCUMENTS

| | | | |
|---|---|---|---|
| 5,680,306 A | 10/1997 | Shin et al. | |
| 5,987,383 A | 11/1999 | Keller et al. | |
| 5,991,694 A | 11/1999 | Gudat et al. | |
| 6,087,984 A | 7/2000 | Keller et al. | |
| 6,088,644 A | 7/2000 | Brandt et al. | |
| 6,199,000 B1 | 3/2001 | Keller et al. | |
| 6,501,422 B1 | 12/2002 | Nichols | |
| 6,876,920 B1 | 4/2005 | Mailer | |
| 6,907,336 B2 * | 6/2005 | Gray et al. | 701/50 |
| 7,200,490 B2 | 4/2007 | Lange et al. | |
| 7,216,033 B2 | 5/2007 | Flann et al. | |

(Continued)

*Primary Examiner*—Khoi Tran
*Assistant Examiner*—Brian J. Broadhead
(74) *Attorney, Agent, or Firm*—Darby & Darby P.C.

(57) ABSTRACT

A system and method provide for precision guiding of agricultural vehicles along a series of adjacent paths to form rows for cultivating a field. In one aspect of the invention the vehicle is moved along a first path while receiving positioning information from a navigational system (e.g., RTK GPS). This positioning information is stored in a processor and is used by the processor to compute a second path adjacent to said first path by calculating piecewise perpendicular offsets from the first path at multiple locations along the first path. The process is repeated to compute a third and subsequent paths so as to cover the field. Because of the offset process, the field may be covered with paths that have varying curvature along their length, while providing substantially no gaps or overlaps in the coverage of the field. In another aspect of the invention, the system may propose alternative paths and the user can intervene by steering the vehicle or using a graphical user interface to select among the alternative paths. A still further aspect of the invention allows for the recording of the paths that provide coverage of a field in the form of a template. This template can then be used to cause the vehicle to automatically steer along a previously calculated path in subsequent operations on the field, and in subsequent years.

6 Claims, 12 Drawing Sheets

U.S. PATENT DOCUMENTS

| | | | |
|---|---|---|---|
| 7,228,214 B2 * | 6/2007 | Flann et al. .................... | 701/50 |
| 2003/0187560 A1 * | 10/2003 | Keller et al. .................. | 701/50 |
| 2004/0186644 A1 * | 9/2004 | McClure et al. ............... | 701/50 |
| 2004/0193348 A1 * | 9/2004 | Gray et al. .................... | 701/50 |
| 2005/0197757 A1 * | 9/2005 | Flann et al. .................... | 701/50 |
| 2005/0197766 A1 * | 9/2005 | Flann et al. .................. | 701/202 |
| 2005/0288834 A1 * | 12/2005 | Heiniger et al. ............... | 701/23 |
| 2007/0192024 A1 * | 8/2007 | Flann et al. .................. | 701/207 |

* cited by examiner

SYSTEM AND METHOD FOR INTERACTIVE SELECTION AND DETERMINATION OF AGRICULTURAL VEHICLE GUIDE PATHS OFFSET FROM EACH OTHER WITH VARYING CURVATURE ALONG THEIR LENGTH

CROSS-REFERENCES TO RELATED APPLICATIONS

This application is related to an application entitled "System and Method Propagating Agricultural Vehicle Guidance Paths That Have Varying Curvature Along Their Length" with Ser. No. 11/051,266 filed Feb. 4, 2005 and incorporated herein by reference in its entirety; an application entitled "System and Method for Interactive Selection of Agricultural Vehicle Guide Paths Through a User Interface Other Than Moving the Vehicle" with Ser. No. 11/051,507 filed Feb. 4, 2005 and incorporated herein by reference in its entirety; and an application entitled "System and Method for Guiding an Agricultural Vehicle Through a Recorded Template of Guide Paths" with Ser. No. 11/051,506 filed Feb. 4, 2005 and incorporated herein by reference in its entirety.

BACKGROUND OF THE INVENTION

1. Field of the Invention

The present invention relates to a system and method for guiding agricultural vehicles during planting, cultivating, spraying, harvesting or other operations.

2. Discussion of the Related Art

In modern farming operations, increased efficiencies and yields can be achieved by precision guidance of agricultural vehicles (e.g., tillers, seeders, sprayers and harvesters) over land areas to be cultivated. These precisely guided vehicles allow rows to be tilled in a relatively efficient manner.

The task of precision guidance of an agricultural vehicle involves defining a pattern to be followed by the vehicle, locating and orienting the pattern with respect to the area to be covered, and specifying various physical characteristics of the vehicle and implement, e.g., the width of the implement and the location of the implement with respect to the vehicle. With this information it is possible to define a series of paths for the vehicle to travel in an attempt to cover all cultivatable portions of the area. It is important to farmers to completely cover the area for a variety of reasons. One reason is that in tilling and planting operations, it is important to till and plant the entire area to maximize crop production, but to avoid tilling areas more than once to reduce costs, such as fuel costs, operator and equipment hours, etc. Another reason that is that in using insecticide, herbicide, fertilizer, and other spraying operations, if portions of the area are not covered, it is likely that no produce will grow. Likewise, if an area is covered more than once due to an overlap of paths, too much spray may be laid down on that portion of the area, so that emerging plants are harmed.

While calculating the series of paths needed to cover an area with substantially no gaps or overlaps is relatively straightforward when straight paths and/or concentric circular paths can be used, it is believed that this has not been achieved where the necessary or desirable paths have a curvature that varies along at least some of their length. In practice many fields have irregular shapes and contain obstacles (e.g., rocks and trees), so that geometrically predefined paths cannot readily cover them, and paths whose curvature varies along at least part of their length would be preferable.

Recently, the global positioning satellite (GPS) system and other similar systems (e.g. pseudolites or the GLONASS system) have been used to determine the geographic location of an agricultural vehicle to aid in guidance of the vehicle for efficient processing of an area to grow crops. One type of such a GPS system, referred to as Real Time Kinematics ("RTK"), is a process where GPS signal corrections are transmitted in real time from a reference receiver at a known location to one or more remote moving receivers, e.g. receivers mounted on a vehicle. By using differential corrections, the RTK system provides the most precise GPS positioning and is capable of compensating for atmospheric delay, orbital errors and other variables in GPS geometry. The result is positioning accuracy up to within a centimeter.

The application of GPS technology to farming is disclosed in U.S. Pat. No. 5,987,383 of Keller et al. (the "'383 patent"). According to the '383 patent, a vehicle makes a first pass or form line by causing a GPS equipped vehicle to travel between two locations in the area, e.g. along one edge. A second adjacent form line is calculated as a parallel swathing offset from the first line, where the swathing offset is the width of a spray pattern laid down by the vehicle or the area tilled in one pass. Guidance of the vehicle is aided by a display of a moving map and a light bar. The patent, however, does not disclose the details of the calculation of the swathing offset, and indicates that sub-meter accuracy is sufficient for most applications. U.S. Pat. No. 6,501,422 of Nichols shows a measurement device integrated with the GPS system to obtain three dimensional position data, as well as roll and pitch angles, and heading.

A prior system called AutoSteer, sold by the AutoFarm division of Novariant, Inc. (formerly known as IntegriNautics Corporation) of Menlo Park, Calif., the assignee of the present invention, uses RTK GPS to provide precision path guidance to farming vehicles carrying out farming operations. This prior product includes a display that shows the farmer a pattern of paths consisting of a series of parallel straight lines, even for concentric circles. The display shows the next proposed path as represented by a solid line in the series of paths, where the other paths are represented by dashed lines. The user can select a different path by steering towards one of the paths represented by dashed lines, in which case that path will become the proposed path and be displayed as a solid line.

It would be desirable if a system and method could be provided that is capable of guiding farm vehicles with high precision along arbitrary paths having varying curvature along at least part of their length, such that an area to be cultivated is substantially covered without skipping or overlapping portions thereof. It would further be desirable if the vehicle could be steered automatically, if alternative paths could be presented to and selected by the user through an interface that does not involve steering the vehicle, and if the selected sequence of paths could be recorded to form a template for later use on the same field.

SUMMARY OF THE INVENTION

The present invention is directed to a system and method for guiding a vehicle that overcomes many of the problems of the prior art. According to a first aspect of the invention, a path with varying curvature along at least part of its length is propagated across a field using piecewise perpendicular offsets. A second aspect of the invention uses an interactive moving map display to show the paths already covered, the path being recorded, and the proposed path to be followed. The display also acts as an interface that allows a user to change a selected path of any shape to a different possible path, other than by moving the vehicle. A third aspect of the invention allows alternative paths of varying curvature along at least part of their length to be selected by the operator by steering the vehicle or by selecting through an independent user interface. According to a fourth aspect of the invention, the paths created by the system can be recorded and later used as a template for repeating the same pattern of paths. These aspects can be used alone or in combination, within the scope of this invention.

In accordance with an exemplary embodiment of the present invention, a method and apparatus are provided for guiding a vehicle along a series of adjacent paths. In carrying out the method, the vehicle is moved along a first path. This path can be a border of an irregularly shaped plot of land that is to be cultivated. The system receives positioning information about the vehicle during its movement along the first path. This information could be provided, e.g., through the use of GPS technology. The positioning information is recorded by the system. Then a processor computes a second path adjacent to said first path by calculating a piecewise perpendicular offset from the first path at multiple locations along the first path as defined by the stored positioning information. The offsets are substantially perpendicular to a local tangent to the first path at the locations. The vehicle is then either manually or automatically steered over the computed path and third and subsequent paths are computed based on the prior paths so as to cover an area with substantially no gaps or overlaps. During movement of the vehicle, its track can be shown on a moving display mounted in the vehicle.

Should an obstacle be in the way along the path, the user can take over and steer around it. Then control of steering can be returned to the system. However, the change in the path due to the manual steering is included in the calculation of the new path, and may result in the system calculating two or more alternative proposed paths. Should the calculation develop alternative paths, they are presented to the user on the moving map. In one embodiment, the paths are presented to the user in sequence: one path is presented first, and the user can accept or refuse it, and if he refuses it, the alternative path is presented. In an alternative embodiment, both paths may be presented simultaneously. The user can select the path he desires and the process continues until the area is covered. In addition, the information recorded during coverage of an area can be saved as a template and used for subsequently guiding the vehicle over the same plurality of paths.

While various preferred and/or exemplary embodiments are described herein, the invention is intended to be construed in accordance with the appended claims and all equivalents thereof.

DESCRIPTION OF THE DRAWINGS

These and other features, aspects, and advantages of the present invention will become better understood with reference to the following description, appended claims and the accompanying drawings wherein:

FIG. 8b is a view of the moving map display during the course of operations on the field of FIG. 3; wherein the operator has selected an alternate path to that proposed in FIG. 8a;

DETAILED DESCRIPTION OF THE PRESENTLY PREFERRED EXEMPLARY EMBODIMENTS

The present invention is directed generally to the guidance and semi-autonomous steering of vehicles. More specifically, several embodiments of aspects of the invention are directed to an interactive semi-autonomous system which assists in guiding and steering an agricultural vehicle so as to cover, substantially without skips or overlaps, an area of land with an arbitrary pattern of adjacent paths of finite width, where the paths themselves can have arbitrary shape (straight, fixed curvature or varying curvature along their length). This system is useful in the process of agricultural cultivation of a field by plowing or tilling, planting, spraying and/or harvesting. The field may be open with an arbitrary or irregular boundary, or it may be a field configured for row crops with uniform geometric boundaries.

Figure 1:
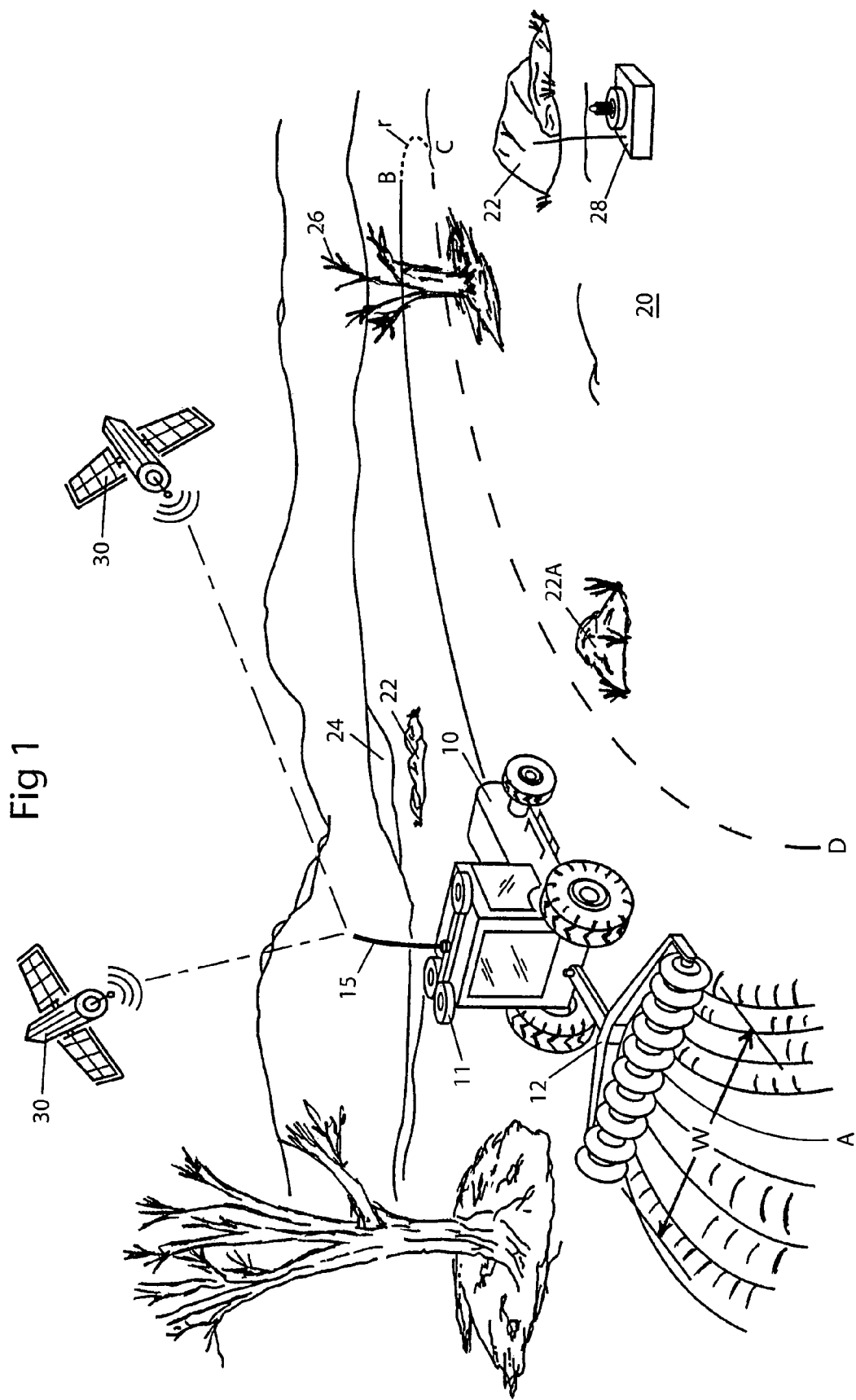
FIG. 1 is a view of an open field being processed by an agricultural vehicle equipped with a GPS guidance system utilizing the present invention.

FIG. 1 shows an agricultural vehicle 10 operating in an open irregularly shaped agricultural field 20. In this example, the vehicle is equipped with a plow 12, which allows for tilling of the soil. Various controls in the cab of vehicle 10 allow an operator to control the raising and lowering of the plow 12.

Field 20 may include a number of obstacles, such as boulders 22, streams 24 and trees 26. During movement of the vehicle 10 through the field 20 during some agricultural process, these obstacles must be avoided, while still efficiently covering the area. In working a field such as field 20, the essential problem facing farmers is to take a vehicle of finite processing width W and to cover the ground as completely and efficiently as possible, i.e., to cover all the ground at least once (no gaps), but to cover none of the ground twice (no overlaps). This applies equally to most operations in the crop cycle, e.g., tillage, planting, cultivation, spraying, and harvesting. Given the nature of vehicle motion, the problem reduces to covering a given area with a pattern of paths (swaths) of finite width W.

Earlier RTK-based farm vehicle steering systems have been limited to steering along geometrically predefined and constrained patterns (e.g. straight or circular patterns). However, many fields, such as the one illustrated in FIG. 1, have geographical features (overall shape, streams, terraces, contours, etc.) that do not lend themselves to coverage by predefined geometrical patterns. Instead the geographical features dictate arbitrary paths (which may include straight and curved sections, in particular, paths that have varying curvature along their length). Nevertheless, farmers wish to propagate these irregular paths across the field without skips or overlaps. The purpose of a first aspect of the present invention is to assist in accomplishing this task to levels of precision commensurate with the measurement accuracy provided by RTK GPS systems. In general this is done by knowing accurately the position and heading of the vehicle, computing a series of paths for efficient coverage using piecewise perpendicular offsets of prior paths, and guiding the vehicle over the paths.

Figure 2:
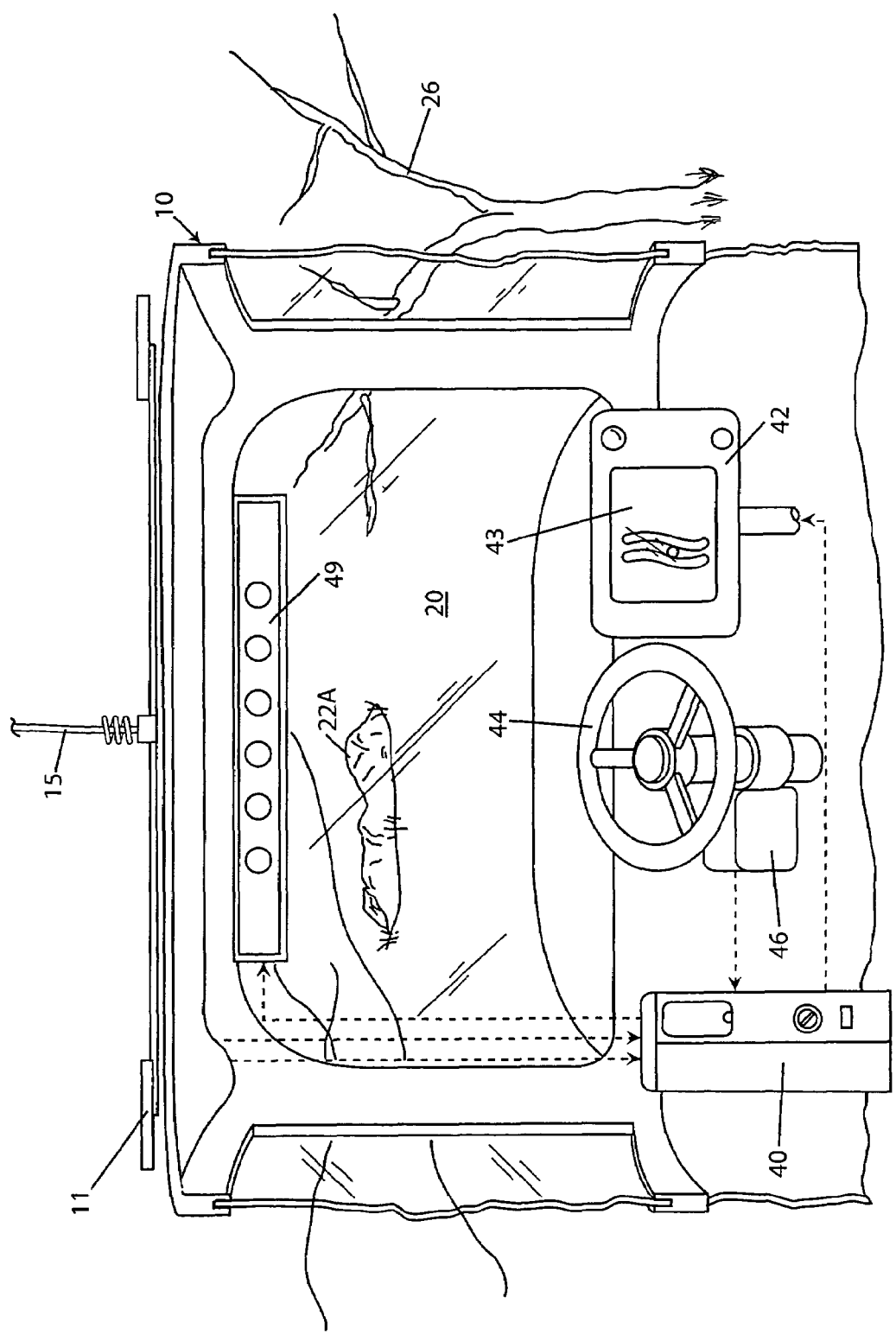
FIG. 2 is a view of the field of FIG. 1 from the cab of the agricultural vehicle equipped with a GPS guidance system according to the present invention.

In order to accurately know the position of the vehicle, it is equipped with a navigational system, e.g., GPS technology. In particular, the vehicle includes a GPS antenna 11, which is mounted on the vehicle so as to have a clear view of the sky and to receive GPS data from one or more GPS satellites 30. Vehicle 10 also has a GPS receiver 40, which may be mounted inside the cab of the vehicle as shown in FIG. 2. This receiver 40 is capable of interpreting the GPS data received through antenna 11 so as to provide position information.

While basic GPS data can provide information with a reasonable degree of accuracy, for greatly improved accuracy differential GPS correction information, e.g., an RTK system, may used. As a result, one or more stationary terrestrial antenna/receiver combinations 28 (FIG. 1) are positioned near the field 20 to provide differential GPS correction information and to transmit it to an antenna 15 on the vehicle, which is also connected to the GPS receiver 40. An antenna array 17 has three GPS antennas, including antenna 11, and can be used to calculate the attitude (pitch, roll, and yaw) of the vehicle. Alternatively an array with two antennas can be used to calculate two components (typically yaw and roll) of the attitude.

As an alternative or in addition to the local differential correction provided by antenna/receiver 28, the system may receive differential GPS correction information from other sources (e.g., satellite transmissions such as WAAS, EGNOS, OmniStar, and GreenStar). Systems using only these alternative differential corrections typically have lower accuracy than RTK GPS systems, but can still be used with many aspects of the current invention.

The GPS receiver 40 uses the GPS data provided through antenna 11 from the GPS satellites 30 and the differential GPS information received through antenna 15, to compute position information for the vehicle 10 at the time the GPS data is collected. While two satellites 30 are shown, more typically at least four satellites are used for accurate positioning. Note that in some embodiments antennas 11 and 15 can be combined in a single package. The positional computations may occur periodically, for example, several times each second. Using differential GPS correction techniques common in the art, position accuracy of less than a meter may be obtained. If an RTK system is used, the accuracy can be in the range of centimeters, and typically better than 10 centimeters.

Although the methods and apparatus of the present invention will be described with reference to GPS satellites, it will be appreciated that the teachings are equally applicable to navigational systems which utilize other precision navigational or guidance technology, e.g., pseudolites, which are a ground based system, or to a combination of satellites and pseudolites, or to methods and apparatus of the GLONASS system, which is another satellite-based positioning system. In addition, the navigation or guidance system of the invention may be supplemented with non-satellite based guidance systems and methodologies, such as inertial navigation systems, distance and gyro compass and/or other heading indicator systems, laser range finding and bearing indicator systems, etc.

According to an aspect of the invention, the vehicle path is first defined by having the vehicle traverse the field 20 between a first location A and a second location B, which define a first path as shown in FIG. 1 as a solid line. During this movement the system is in a "record" mode so that the positional information is recorded and the first path is defined. At the end of the path the record mode is stopped and the vehicle is then turned around, shown by the dotted line between B and C, and a second adjacent path is created from location C to location D as shown in FIG. 1 as a dashed line. However, the second path is calculated based on (1) a determination of an offset equal to the width W of the processing of the field during movement of the vehicle along a single path (e.g., the spread of chemicals delivered from the boom of a sprayer, the width of the rows plowed by a tiller, etc.); (2) the positions recorded while the vehicle traversed the path from A to B, which positions were recorded as a series of GPS locations that form the path; and (3) piecewise perpendicular offset calculations at multiple locations along the first path, which create the calculated adjacent path.

The vehicle must follow a path through field 20 that accommodates not only the contours of the field but also the various terrain features and obstacles present in that field. For example, vehicle 10 must avoid the rocks 22 and trees 26, and yet still follow a path that allows for precise processing of the field, e.g., the tilling of the field with plow 12. The centers of the various paths are separated from each other by substantially the effective processing width of the implement used by the vehicle, e.g., the width W of the plow 12. This offset ensures that all areas of field 20 are adequately (but not overly) covered.

FIG. 2 illustrates a view from the cab of an exemplary agricultural vehicle 10 as it traverses the field 20. However, it will be appreciated that other embodiments with varying configurations may also be used. In order to determine its location, GPS data is received over antenna 11 and is applied to receiver 40. In addition, differential GPS correction information is received over antenna 15 and is also applied to receiver 40. Receiver 40, in addition to radio frequency reception equipment, contains a system processor which is programmed to carryout the various functions of the present invention. The processor includes memory for storing a program that controls its functions so it can carry out the methods of the present invention. The processor further includes storage memory which is large enough to store the data on the GPS points along a path, the results of path calculations, and collections of path information that represent coverage of a field in the past. In particular, the processor's stored program allows it to calculate the position of the vehicle, record its movements when defining a base path, calculate the next adjacent path and provide information for a display 42 located in the cab. The display 42 may include a moving map display 43, which displays the location, orientation, and progress of the vehicle 10 with respect to the field 20 and the recorded paths. The image in the display 42 may be oriented to point North or to point in the direction of vehicle motion or in any other direction. The process for generating moving map display information is well known in the art and need not be described further.

The processor storage memory is described as being located in the cab of the vehicle. However, this memory may be of the removable type, so that recorded path information may be transferred from one vehicle to another or to a central computer system. Information may also be transferred from the vehicle processor to a central system by a wired or wireless connection. Thus, a central location could monitor the activities of a fleet of vehicles in real time while they are being guided.

Through the use of the moving map display 42, an operator of the agricultural vehicle 10 is provided with simple and effective information during processing operations within field 20. This information shows the progress and paths followed while covering the field, conveys decisions made and paths calculated by the guidance system. Moreover, the display provides a user interface allowing the operator to interact with and influence the guidance system.

The vehicle may be manually steered by the operator using steering wheel 44, and to assist in this operation, guidance information may be conveyed on the display, or in the form of a light bar 49 driven by the receiver/processor 40, as is well known in the art. Further, the processor could drive a voice system (not shown) to guide the operator of the vehicle along prescribed paths.

However, in a preferred mode, the vehicle is automatically steered by an automatic steering device 46 based on control signals from the processor of receiver/processor 40. The steering system referred to as AutoSteer, as described above, may be used for this purpose. Thus, guiding of the vehicle can be due to manual steering by the operator or automatic steering.

If the vehicle is being automatically steered so as to traverse a path calculated by the system and the path leads through an obstacle, e.g., rock 22A, the operator can take control and avoid the rock by turning steering wheel 44 to steering around it. This manual correction may be sensed by device 46, which in turn provides the information to receiver/processor 40. In addition, the GPS system will detect the altered path of the vehicle and this information may also be input to the processor via inputs from antennas 11, 15. In either case, the system is provided with real-time updated information on vehicle deviations from the calculated path.

Figure 3:
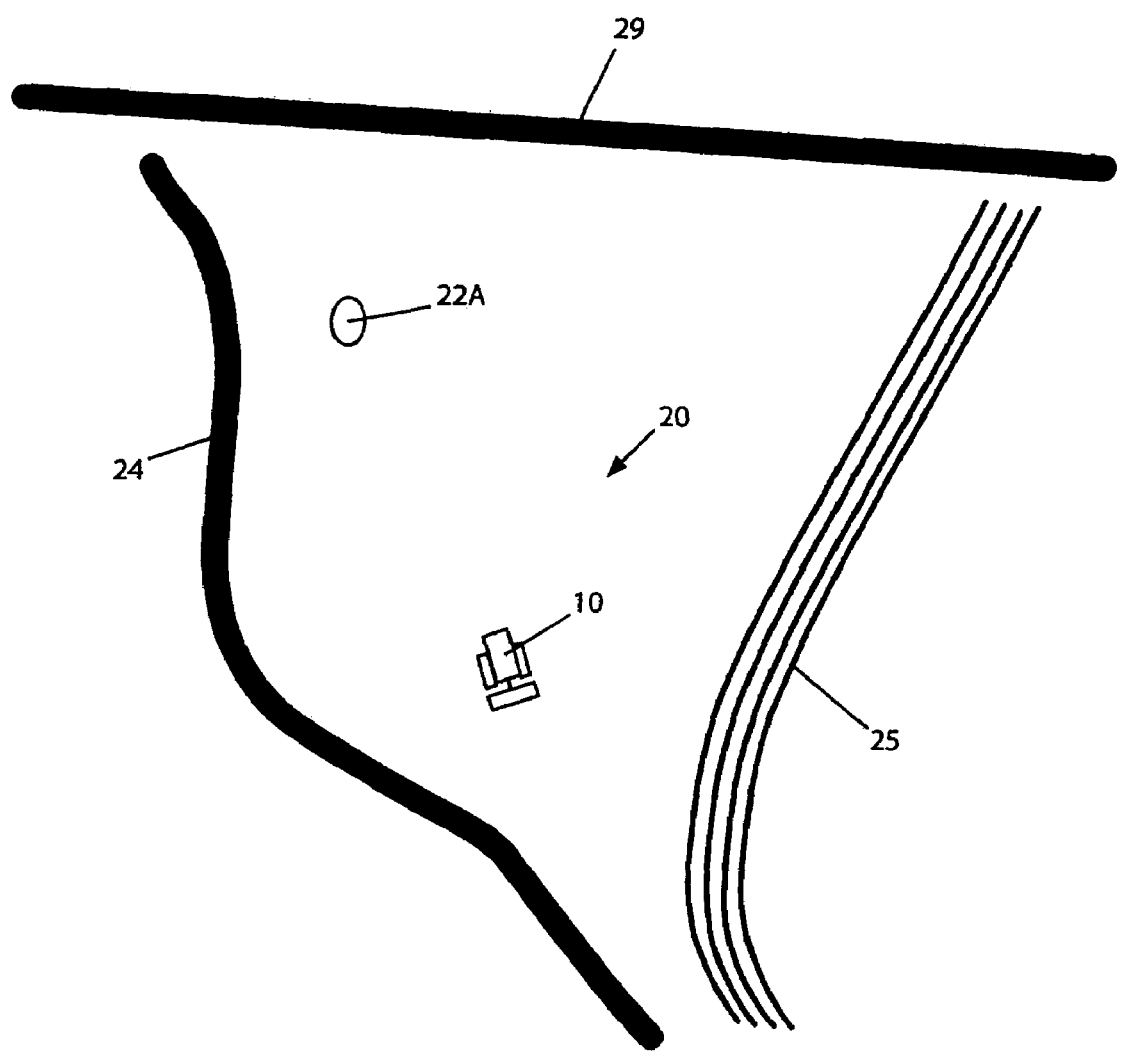
FIG. 3 is an aerial view of an arbitrarily shaped field like that of FIG. 1.

A simple example will serve to illustrate the basic operation of exemplary embodiments of the invention, and introduce the steps and components involved. FIG. 3 shows an aerial view of a farm tractor 10 in a field 20 that is bounded to the east by a terrace 25, to the west by a stream 24, and to the north by a road 29. In the northwest corner is a large rock 22A, which must be avoided during operations. For this illustration assume that plowing is the operation to be performed.

Figure 4:
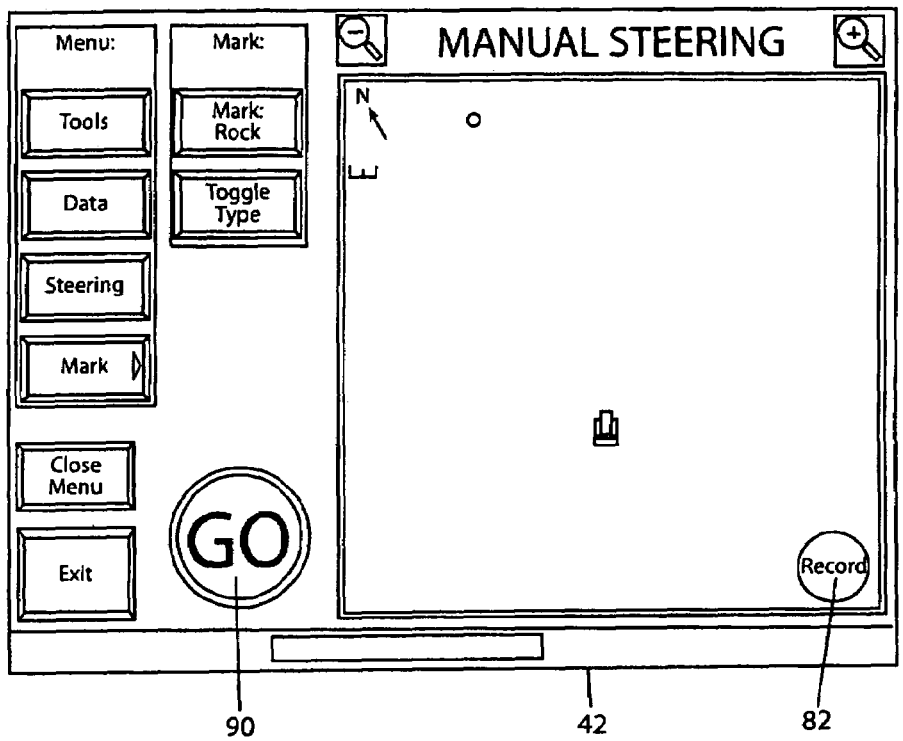
FIG. 4 is a view of a moving map display according to an aspect of the invention before beginning operations in the field of FIG. 3.
Figure 5:
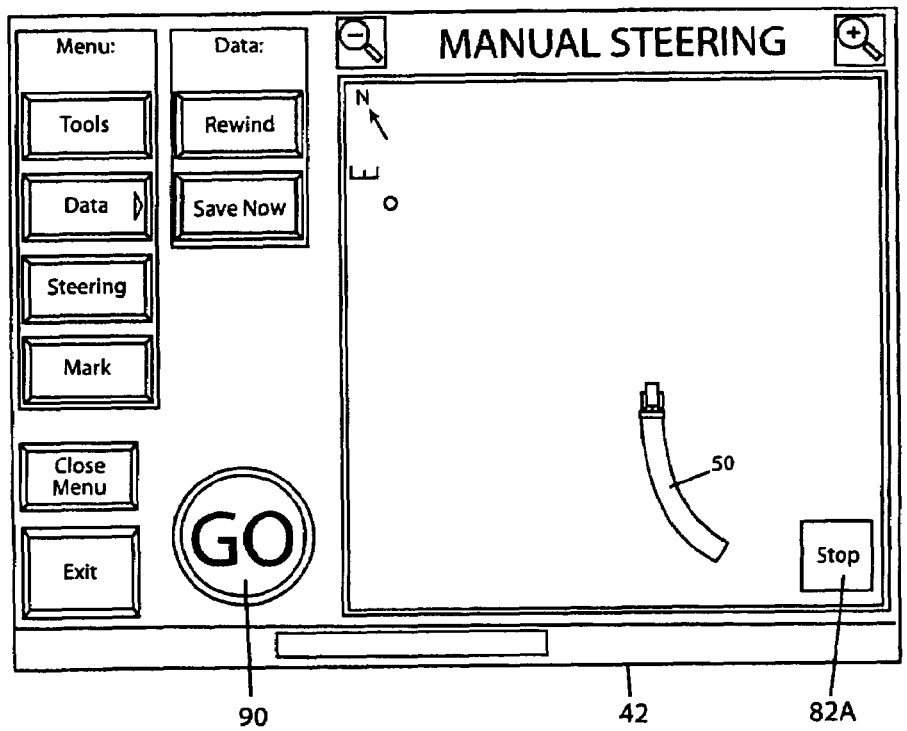
FIG. 5 is a view of the moving map display during the course of operations on the field of FIG. 3, wherein a first path is being driven, recorded, and displayed.

FIG. 4 shows the user interface display 42 immediately prior to beginning the plowing operation for the field 20 shown in FIG. 3. The moving map display 42 is blank, because the processor's memory contains no previously worked paths associated with the present field. The operator must decide how to begin working the field. In this example, he chooses to begin by plowing a path adjacent to the eastern terrace 25. Since there are no paths in memory, there are no paths for the system to propagate, and no paths for the system to steer along automatically. The operator must drive the first path manually. In order to do this he drives to the starting point, presses the "Record" button 82, and begins driving. The system records the path followed by the vehicle by recording its position as determined by the navigation system, e.g., the RTK-GPS system, at selected points as it moves down the initial path. The system displays the path 50 in real time as it is traveled and recorded (FIG. 5).

On reaching the end of the first path, the operator presses the "Stop" recording button 82A to stop the recording. The Record button 82 is circular and is labeled "Record" until it is activated. Once activated it turns into a square button 82A that is labeled "Stop." The pressing of the Stop button 82A signifies the end of the first path. The operator can then turn the vehicle around at the end of the first path as shown in dotted line in FIG. 1, which will cause the system to propagate (offset) this first path so as to create an adjacent second path 51 as shown in solid line in FIG. 6. Note that the curved part of path 50 was at the bottom of the screen in FIG. 5, but is at the top in FIG. 6 because the display orientation is here arranged with the direction of vehicle motion toward the top of the screen. However, a fixed orientation is also possible.

In this embodiment the system will propagate (offset) existing paths in its memory, in the direction of the current vehicle location, to create proposed subsequent paths. These paths can be manually steered along, or preferably, the system will automatically steer the vehicle along such paths. A unique aspect of a preferred embodiment of this aspect of the invention is that the propagated path is calculated using piecewise perpendicular offsets in such way that there will be substantially no skips and overlaps between adjacent paths.

Figure 6:
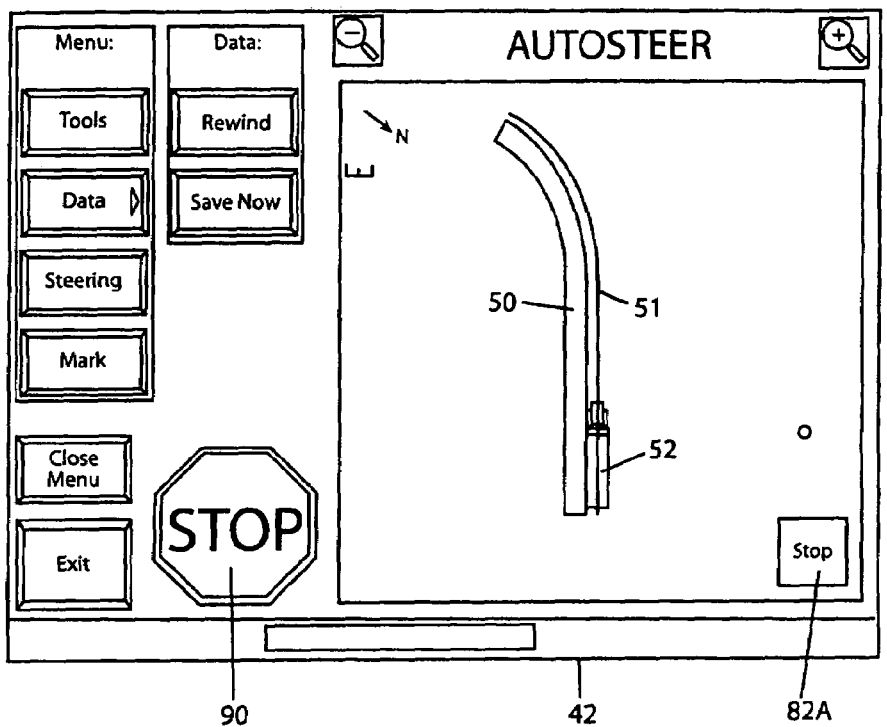
FIG. 6 is a view of the moving map display during the course of operations on the field of FIG. 3, wherein the vehicle is being automatically guided along a second path, which is being recorded and displayed.

Thus, on turning around at the end of the first path 50, the operator has the option to allow the system to automatically steer the vehicle in the return direction along the propagated curve 51 which will lead him along adjacent path 52. In order to select the automatic steering mode, the operator pushes the GO button 90 on the display (FIG. 5). Moreover he has the option to record this second path as it is traversed (whether under manual or automatic steering). FIG. 6 shows the display with the vehicle midway along the second path 52 following the projected curve 51. Notice that Go button 90 has changed to Stop button 90A in FIG. 6.

On reaching the end of second path, the operator stops recording (signifying the end of the path) and turns around.

Figure 7:
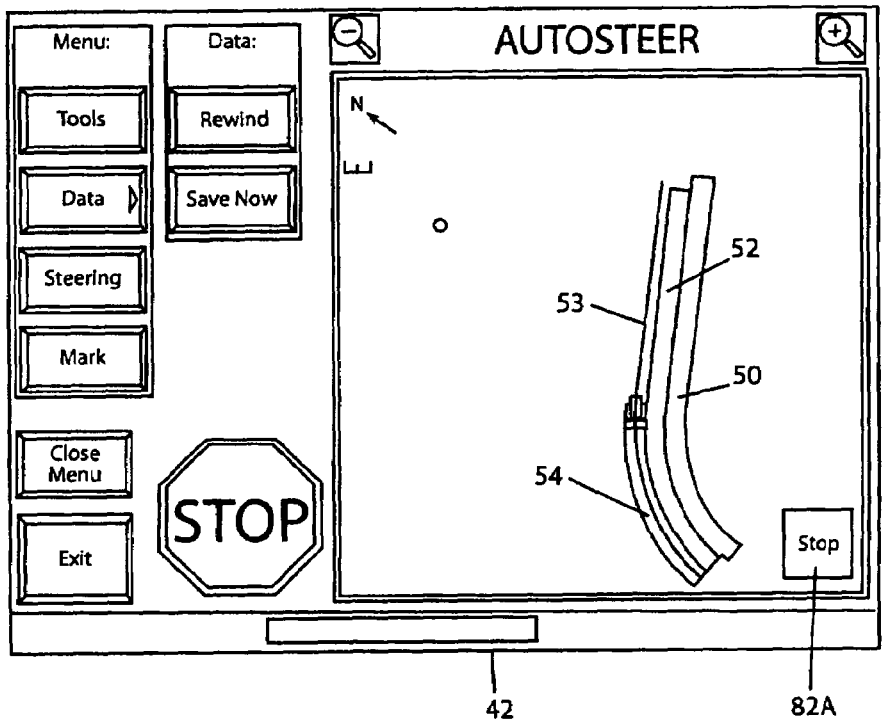
FIG. 7 is a view of the moving map display during the course of operations on the field of FIG. 3, wherein the vehicle is being automatically guided along a third path, which is a propagation of the second path.

Now the system has two paths in memory (50, 52), and is able to propagate new proposed paths based on either of the previously recorded paths. The rows that have already been driven and recorded may be shown on the display in a different color. The next row that will be driven automatically (if the operator presses "GO" button 90 and turns over steering control to the system) is shown with a solid line 53 (FIG. 7). The row that this line is based on (either 50 or 52) may be highlighted in the display in another color. At any time, the system propagates from the path that most closely matches the vehicle's current position and heading. In FIG. 7 the system is driving a third path 54, which is a propagation (offset 53) of the second path 52. The operator can repeat the above procedure indefinitely, propagating adjacent paths across the field. In each case, the offset path is calculated so that there are substantially no skips and overlaps relative to the previous path. FIG. 7 shows the progress of such an operation. On the display 42 the adjacent paths are deliberately drawn slightly narrower than their scaled width, so that the operator can distinguish one path from another. This should not be taken to imply that there are gaps in the field.

Figure 8A:
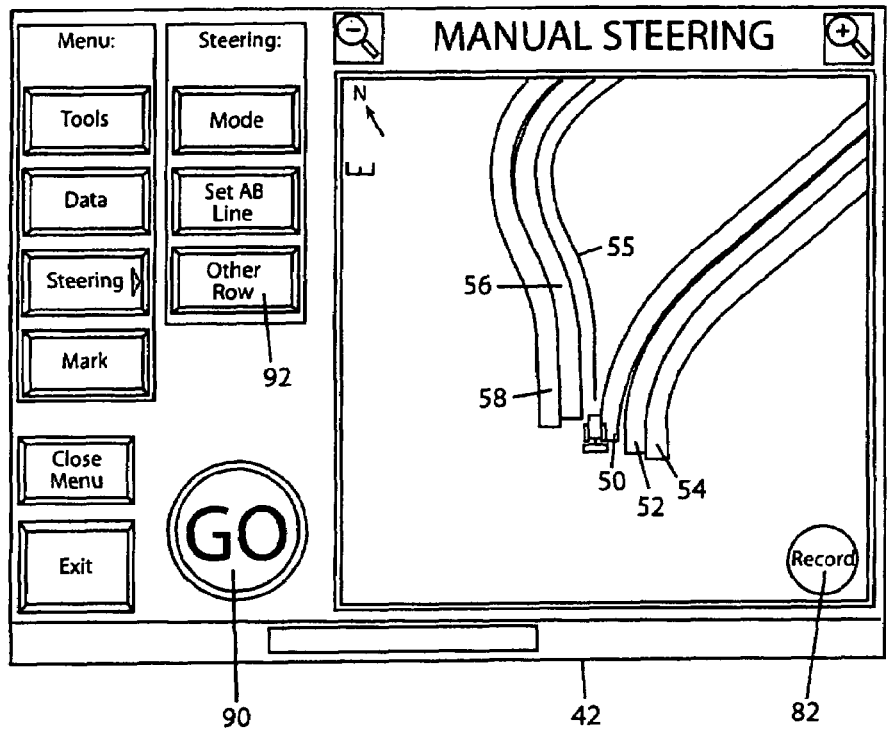
FIG. 8a is a view of the moving map display during the course of operations on the field of FIG. 3, wherein several paths in each of two different series of adjacent paths have been worked.

The operator can propagate these path shapes based on the terrace as far into the field as he desires, but after several passes he may decide to begin plowing adjacent to the stream. To do this he can simply drive to a starting point adjacent to the stream, record a first path 58 (FIG. 8a) adjacent to the stream (here again the first new path of each new series must be driven manually), and thereafter begin propagating and plowing adjacent paths, e.g., 56, towards the center of the field. FIG. 8a shows the progress of the operation after several adjacent paths of each series have been plowed. Note that the system handles each newly recorded path in the same way as all the others, i.e. as a potential source for propagation, choosing the most likely source based on the position and location of the vehicle at the time. Moreover, a third and subsequent series of adjacent paths can be added in the same way, hence allowing the operator to create an arbitrary pattern of adjacent paths of arbitrary shape as he sees fit to best cover the area of the field. Note that the paths 50, 52, 54 as well as paths 56, 58 have relatively straight sections and curved sections, including sections in which the curvature varies along their length.

Figure 8B:
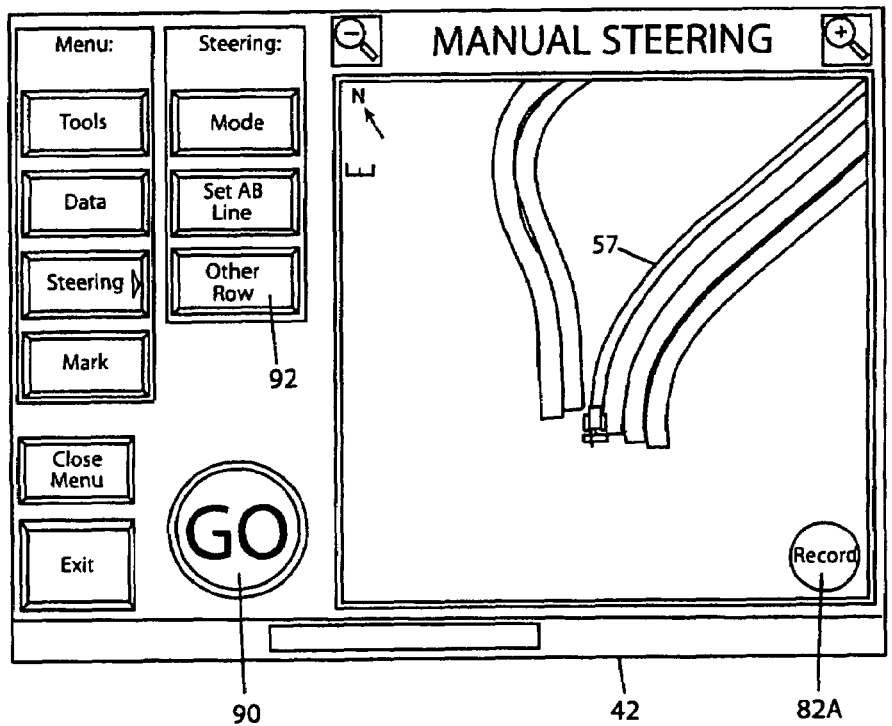

An interesting situation arises when the two series of adjacent paths converge in the center of the field. Now that the operator has reached the center of the field, the system is proposing (FIG. 8a) that the operator continue along a curve 55 in the left-hand series of curves. Note that the system selects the most likely propagation source based on the vehicle's current location and heading. In this case, the operator actually wants to continue the right-hand series, and achieves this by pressing "Other Row" button 92, which forces the system to select the next closest row as a potential propagation choice. This results in the projected curve 57 in FIG. 8b, which is the operator's desired path. Accordingly, in preferred embodiments of one aspect of the invention, the operator is able to interact with the system and influence its decisions.

Figure 9A:
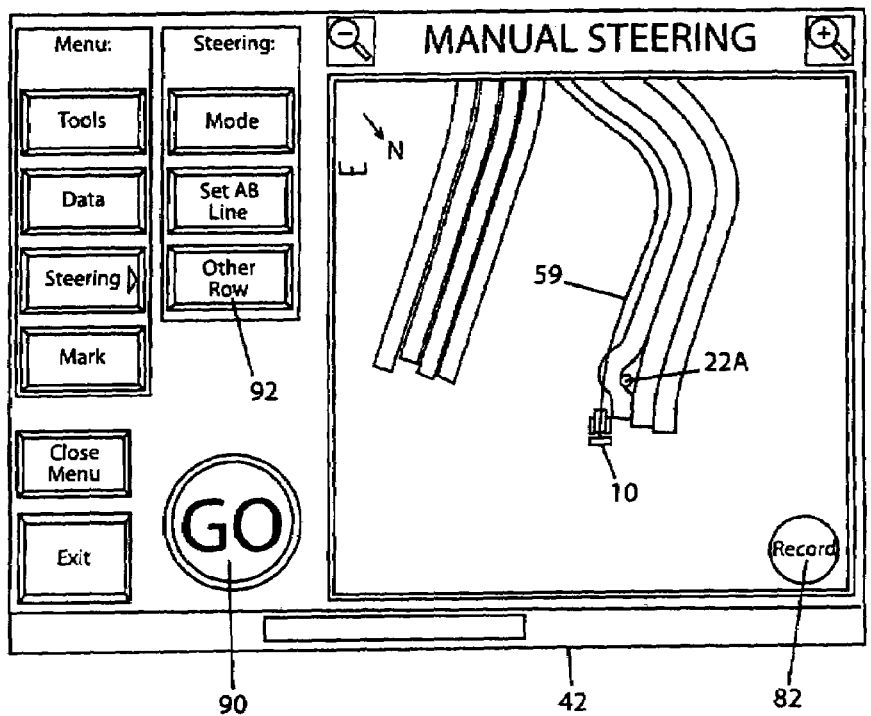
FIG. 9a is a view of the moving map display during the course of operations on the field of FIG. 3, wherein the operator has driven around a rock on the immediately previous path.
Figure 9B:
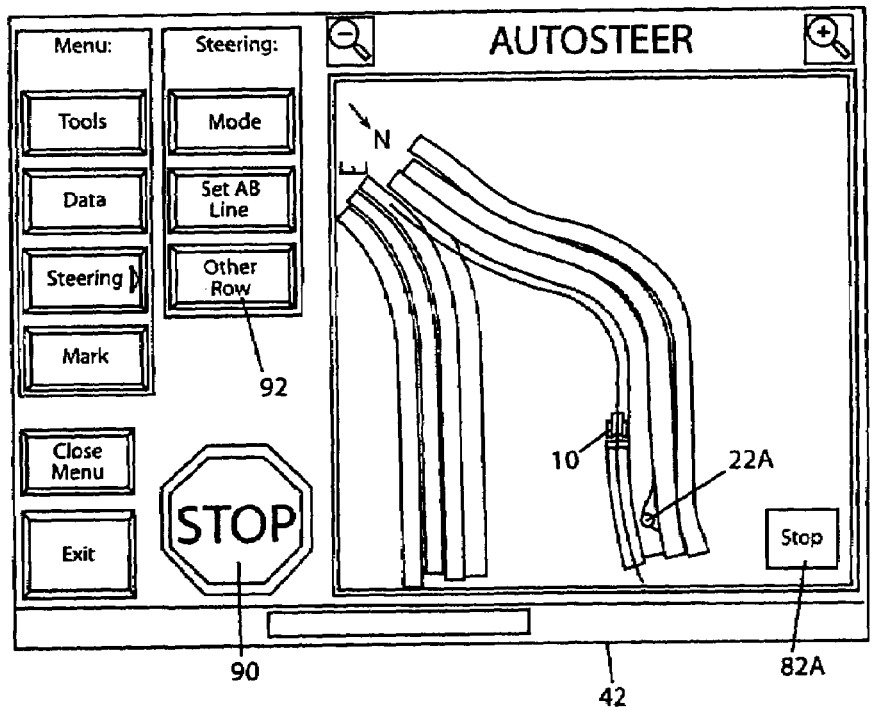
FIG. 9b is a view of the moving map display during the course of operations on the field of FIG. 3, wherein the operator has selected an alternate path based on a path prior to that in which the rock was driven around.

Another interesting situation arises when the operator must avoid the rock. FIG. 9a shows that on the previous row, the operator has driven around rock 22A in the field. Typically the system propagates off the last row driven (because it is typically also the closest row), but in this case propagation of the last row would cause propagation of the kink due to the rock. This is not desired, and therefore the operator has pressed "Other Row" button 92 causing the system to choose the next closest row as the propagation source. The result is a proposed row 59 that preserves the overall pattern, and results in reworking only the small portion of field next to the rock as shown in FIG. 9b. One way to avoid this reworking is for the operator to lift the plow as the vehicle travels over the overlapped portion from the previous row.

Another interesting situation arises when, after completing the plowing of the field, the operator wishes, e.g., to plant a crop in the furrows created during the plowing operation. As will be clear from the above description, the covering of the field with adjacent rows requires a level of skill on the part of the operator. In particular, the operator must design and create a pattern of path shapes that best cover his field. Preferred embodiments of one aspect of the present invention make the job easier by automatically propagating adjacent paths such that there are substantially no skips and overlaps, and optionally automatically steering the vehicle down the paths (skills that previously were a further burden on the operator). However, there is still skill involved in the creation of the pattern. This observation, coupled with the typical crop cycle involved in farming (a field must be plowed, planted, fertilized, sprayed, and harvested to produce a crop), introduces a further aspect of a preferred embodiment of the present invention. Namely, having created a master pattern or template for a field, farmers typically wish to repeat that pattern multiple times during a given year (crop cycle) and in subsequent years (future crop cycles). For this reason, an embodiment of an aspect of the present invention is directed to a system and method having two principle modes—a "master" or creative mode (which has been described thus far) and a "repeat" mode in which the system causes the vehicle to follow a previously recorded path.

In the case of the master mode described above, the goal of the system is to propagate and record adjacent rows so as to cover an area. The goal of the repeat mode is simply to guide the operator in repeating the same pattern. The operator might steer the vehicle manually, following the guidance provided by the system, or preferably the system will steer the vehicle automatically. In the case of the repeat mode, it is assumed that a pattern or "template" for the field has already been created and recorded. Typically this would be done by an original working of the field in master mode, but other modes are envisioned, such as laying out a master pattern from a map of the field at a desktop computer.

Figure 10:
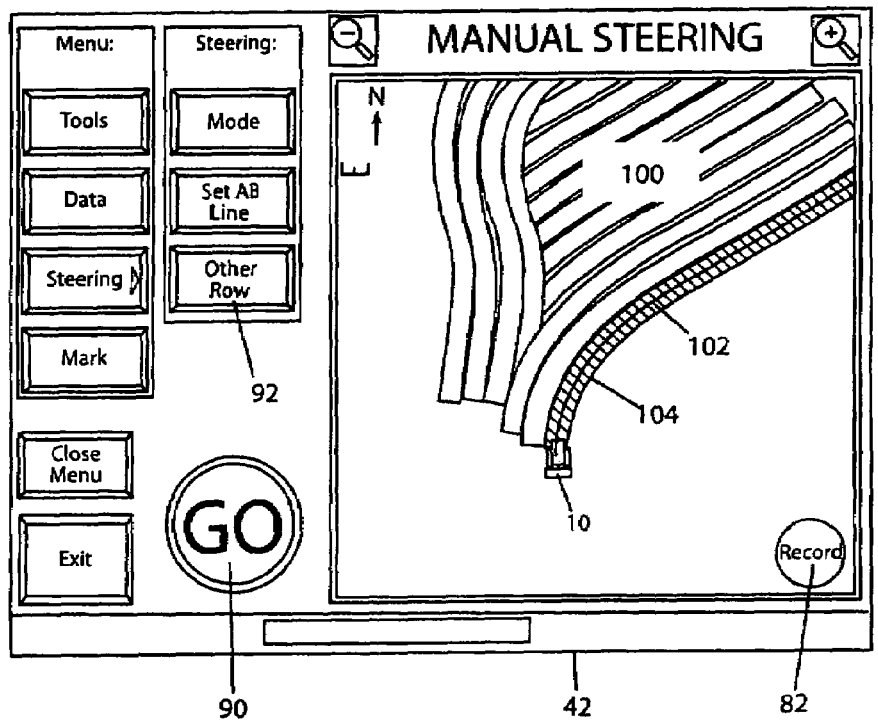
FIG. 10 is a view of the moving map display during the course of operations on the field of FIG. 3, wherein the system is in a repeat mode guiding the vehicle along the same pattern of rows driven by the vehicle during a previous operation.

In the repeat mode, a previous master pattern or template is loaded into memory, path propagation is disabled, and the system offers to guide the vehicle only along paths that exist in the master pattern. FIG. 10 shows the user interface when the master pattern created in this example is loaded into the system. Paths 100 in the master pattern may be shown on the display in a particular color or manner. For example, here the paths 100 in the master pattern are shown in one color, the proposed path 102 is shown as a solid line, and the particular path 104 on which the proposed path is based is shown in yet another color. As in the master mode case, the system chooses the most likely desired path based on the vehicle position and heading, but here too, the operator can move the vehicle or use the "Other Row" button 92 to force the system to propose another path. Alternatively, the "Other Row" button can be replaced by voice activation, touch-screen input, mouse or keyboard input, for example. By pressing the "GO" button 90 the operator can turn over steering to the system. Note, however, that in this embodiment in the repeat mode, the system will only offer to steer along paths that exist in the master pattern. In other words, propagation to create new adjacent paths is disabled. In one embodiment, for the special case where the original path width was wider than the repeat path width, limited propagation is available in repeat mode to ensure that the operator can cover the entire area with the narrower vehicle.

Figure 11:
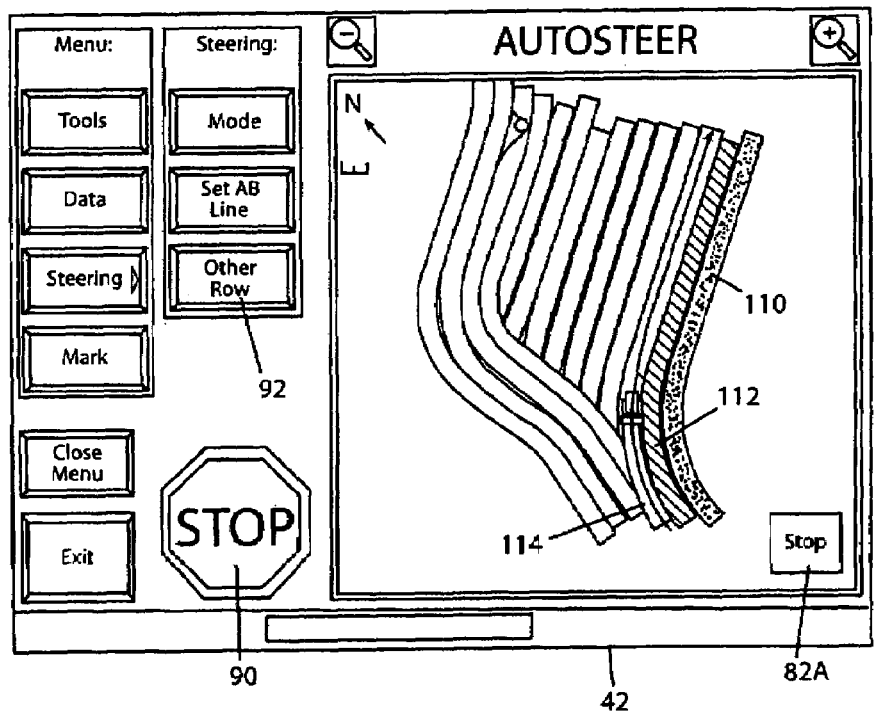
FIG. 11 is a view of the moving map display during the course of operations on the field of FIG. 3, wherein the system is recording the progress of the operation of FIG. 10.

In repeat mode, it is further useful to record the progress of the operation. Therefore, in one embodiment of the invention, the record features of the system remain available, and the operator can record the paths covered in the subsequent repeat operation. These repeat paths may be shown in the display in a distinctive color, and FIG. 11 shows the progress (paths 110, 112, 114) of the operator in reworking the field.

The present invention is preferably directed to the high accuracy guidance of agricultural vehicles. There are at least three aspects which affect the accuracy of the actual paths worked in the field, the measurement accuracy, the vehicle steering accuracy and the condition of the farming implement and its connection to the vehicle. The accuracy with which the position, attitude, etc. of the vehicle is measured depends on the navigation system used. As noted, currently RTK GPS provides a high degree of measurement accuracy. The accuracy with which the vehicle can be steered along the desired path also effects the overall accuracy of the system. Even if the desired path and the position of the vehicle relative to it are known to high accuracy, it may not be possible to control and steer the vehicle to the same accuracy. Aspects such as the soil condition, bumpiness of the terrain, type and condition of the vehicle, actuator authority of the steering mechanism, etc. affect the accuracy with which the vehicle can be steered. In the case of manual steering it is the responsibility of the operator to steer the vehicle as accurately as possible to the desired path, in the case of automatic steering it is the system's responsibility.

Even if the vehicle is steered accurately, the accuracy of the actual furrows left in the ground (e.g. in a tilling or plowing operation) also depends on the condition of the implement and its connection to the vehicle. In order for the system to accurately calculate the desired paths, it must know various parameters such as the width of the implement, its offset and position relative to the navigation system on the vehicle, etc. These parameters are well known to those skilled in the art. If these parameters are not set properly, or if the connection of the implement to the vehicle is loose and not properly constrained, then the accuracy of the furrows may be compromised, even though the navigation, path computation, and steering systems are working accurately.

The state-of-the-art horizontal measurement accuracy of typical RTK GPS systems used in the industry is of the order of 1 centimeter relative to a fixed base-station location. State-of-the-art automatic steering accuracy along straight paths for typical field conditions and vehicles in good condition is of the order of 2-3 centimeters. Automatic steering along curved paths depends on the curvature of the paths, but can be of the order of 2-5 centimeters for typical curvatures. The preferred embodiments of this aspect of the present invention are designed to perform at these accuracies. However, the various aspects of the invention may be coupled with less accurate (and less expensive) navigation systems, in which case the accuracies will be reduced accordingly.

Preferred embodiments of one aspect of the invention are also directed to the problem of calculating adjacent paths which cover an area without, or substantially without, skips and overlaps. With appropriate spacing of the points where the perpendicular offsets are taken and proper smoothing of the loci of the points projected to form the next path, the perpendicular offset method will calculate adjacent paths which cover the area with gaps and skips of the same order as the measurement accuracy of the navigation system used, e.g., the high precision RTK accuracy of 1 centimeter. On the other hand, for typical field sizes and for typical path curvatures, the identical curve propagation methods of the prior art can lead to gaps and overlaps in the calculated propagated paths on the order of 0.5-1 meter and more. Therefore, these prior-art paths do not substantially cover the area without gaps and overlaps as expressed herein for the present invention, i.e., to the level of measurement accuracy available from the most accurate navigation systems. Further, if future navigation systems that are even more accurate become available, the accuracy of the perpendicular offset method can be increased correspondingly by decreasing the point spacing and properly tuning the path smoothing parameters. Therefore, the perpendicular offset path propagation method can be operated so that it introduces errors no greater than the accuracy of the most accurate available navigation systems. This is not true of the prior art where the skips and overlaps introduced by propagating identical copies of curved paths are not significantly reduced by altering the point spacing, smoothing the projected path or otherwise conditioning the data points.

However, it should be noted that the operator may make decisions in special cases which lead to overlaps and skips even when using the present system. For example, where two series of curves converge, there may be skips and overlaps. In other words, it is always up to the operator to decide how to merge two series of adjacent paths, and there may be skips and overlaps that are independent of the path propagation method. Another example is where the operator steers around objects (e.g., steers around an obstacle, but then chooses "Other Row" to avoid propagating the curve variance, due to avoiding the object, across the field). Still further examples are where the operator sets the point spacing too far apart and/or sets the path smoothing parameters too aggressively. In either case, information about the shape of the path could be lost. One of ordinary skill in the art will be able to determine how to tune the point spacing and path smoothing parameters without undue experimentation.

The recording of paths is achieved by recording the GPS navigation position information at selected points as the vehicle moves along the path. The points must be recorded with sufficient frequency to capture the curvature of the path. In the present embodiment, the points are recorded at equally spaced intervals according to a parameter that can be specified by the user or a technician. Good results have been achieved with a spacing of 1 to 3 meters. There is a tradeoff in that the more closely spaced the points, the more data that is required to record a given path, but the more accurate the record of the path. For this reason, embodiments are envisaged which adjust the point spacing dependent on the curvature of the path. In the current embodiment, the operator can place the system in a straight line mode, in which the system assumes that all recorded lines are straight and only records the start and end points of each path.

A feature of preferred embodiments of this aspect of the invention is the ability to calculate (propagate) offset paths adjacent to existing paths already in memory. This propagation is achieved by piecewise perpendicular offsets, i.e., a new adjacent path is created from the original by offsetting each data point in the original in a direction substantially perpendicular to the local tangent to the original path at the original data point. The offset amount is equal to the desired width of the adjacent paths. This propagation has the advantage that the adjacent paths have substantially no skips and overlaps. In order to obtain a path that is suitable for smooth automatic steering at RTK levels of accuracy, several data conditioning and smoothing steps are necessary.

Figure 12:
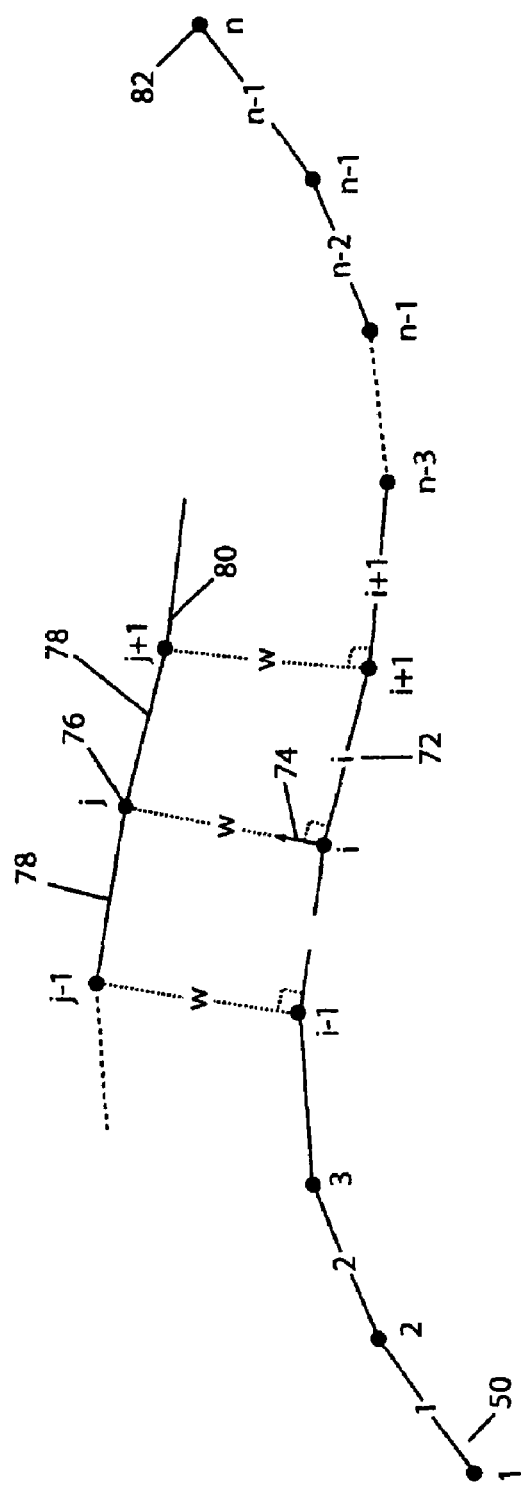
FIG. 12 is an illustration of the details of the technique for creating a new path for the vehicle using a piecewise perpendicular offset.

FIG. 12 is a geometric analysis of the piecewise perpendicular offset that is used in path propagation according to the preferred embodiments of this aspect of the invention. The base path 50 or a previously created path is defined by points 1 ... n. With this arrangement, the $i^{th}$ line segment 72 is the segment joining the $i^{th}$ and $(i+1)^{th}$ points. Projected line 74 is the perpendicular at the $i^{th}$ point to the $i^{th}$ segment. It has a length W equal to the path width. At each point along path 50, a corresponding perpendicular offset is made and the ends 76 of the projections 74 are points j on the propagated path which are joined by line segments 78 to form the propagated path 80. End point 82 is specially handled by projecting perpendicular to the final segment (n−1), since there is no $(n+1)^{th}$ point and no $n^{th}$ segment.

It will be clear to those skilled in the art that each $i^{th}$ line segment is an approximation to the local tangent at the $i^{th}$ point, and thus that each offset is substantially perpendicular to the local tangent at the point being offset.

Figure 13A:
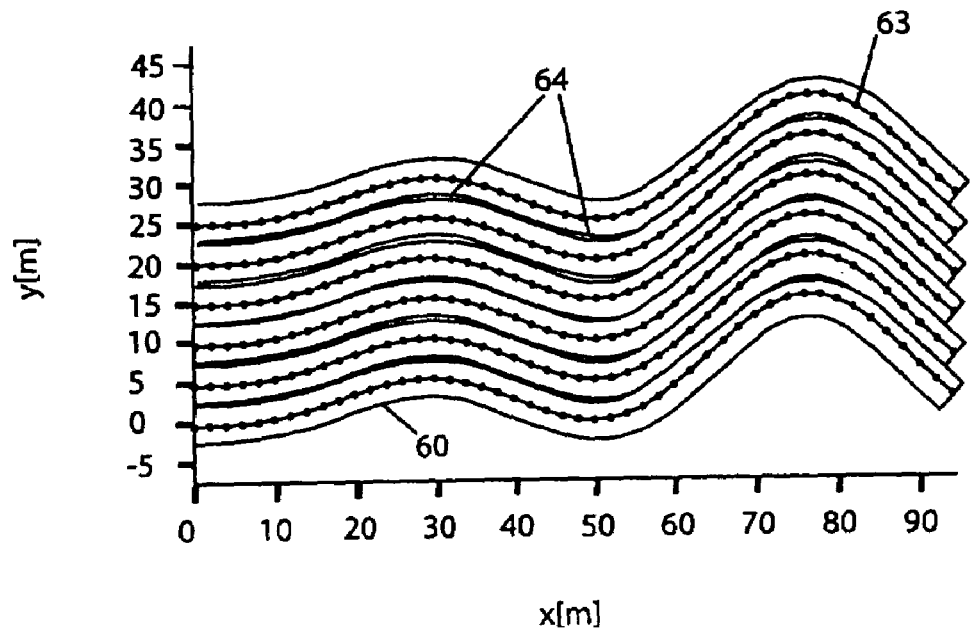
FIG. 13a is an illustration of path propagation using methods of the prior art.

FIG. 13a illustrates a rudimentary propagation of identical copies of a curved path as found in the prior art. The base path 60 is the first curve in the series, which, as explained previously, is created by driving the vehicle over a particular path. In this prior art technique, each successive path is calculated by making an identical copy of the previous path and offsetting the entire copy by the desired path width in a direction substantially perpendicular to the general direction of the previous path. In FIG. 13a, each new path is offset in a direction perpendicular to a straight line drawn through the first and last points that define the previous path, but other implementations are possible. The advantages of identical offset paths are that they are simple to calculate; that they do not amplify noise in the recorded measurements; that the curvature of successive paths does not change; that the point spacing does not change; and that point reversals, loops, and sections of excessive curvature (all of which cause problems when automatically steering along the generated paths) are not produced.

As will be shown below, perpendicular offsets have the complication of not having the advantages set forth above for identical offsets. However, most importantly for the user, in this prior art process, the adjacent curves overlap in some places, while in other places they leave gaps 64. This is undesirable to the farmer. Although FIG. 13a illustrates only one case, it is physically impossible to propagate identical copies of an at least partially curved base path without substantial gaps or overlaps.

Figure 13B:
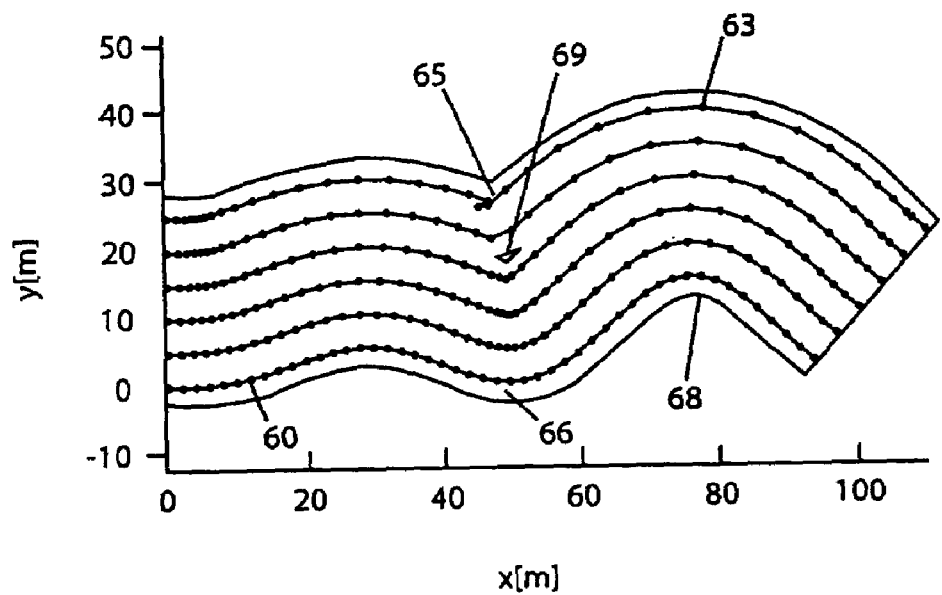
FIG. 13b is an illustration of path propagation using piecewise perpendicular offsets.

FIG. 13b illustrates the propagation of paths according to an embodiment of this aspect of the present invention, i.e., piecewise perpendicular offset. With this technique, the perpendicular distance between adjacent paths is equal to the offset width at a plurality of selected points along the path, i.e., piecewise perpendicular offsets. This gives the desired result, which is coverage of the area without substantial gaps or overlap. Again the bottom curve 60 is the defining or base path. Notice that concave-upward sections 66 in the drawing of the path become sharper, while concave-downward sections 68 become less sharp, due to propagation. Eventually the concave-up sections form a cusp 65, i.e. a curve that is too sharp for a vehicle to negotiate. These sections must be removed to generate a smooth path appropriate for manual or automatic steering, as will be explained later. Nevertheless, it can be seen that, unlike FIG. 13a in which each of the paths is identical, the proposed paths in FIG. 13b have different shapes and there are no gaps and overlaps (except in sections 69 where the curvature becomes excessively sharp).

Simple identical offsets as performed in the prior art lead to substantial gaps and overlaps in adjacent paths. Identical curves will always lead to this situation, and in order to avoid skipping or overlapping areas, the curvature of the curves must change as they propagate. This change in curvature is achieved by the piecewise perpendicular offset of the preferred embodiments of this aspect of the present invention.

No real navigation system can measure the position of the vehicle perfectly, and no manual or automatic driver can perfectly follow a smooth curve. Moreover, as it moves through a bumpy field, the vehicle will inevitably bounce and roll. The result is that points making up recorded paths will also contain high frequency position noise superimposed on the desired smooth path of the operator. Any real curve propagation and automatic steering system must be robust to this noise.

Figure 14A:
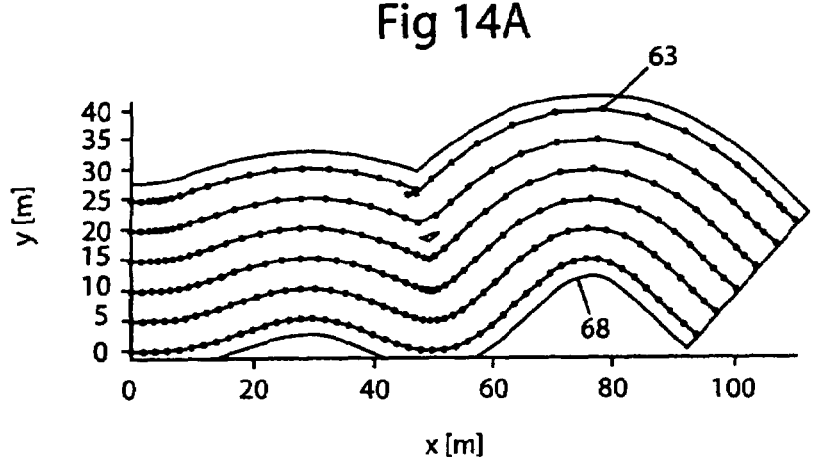
FIG. 14a is the same as FIG. 13b, but aligned with FIGS. 14b and 14c to show the effect of spatial filtering according to one embodiment of an aspect of the invention.
Figure 14B:
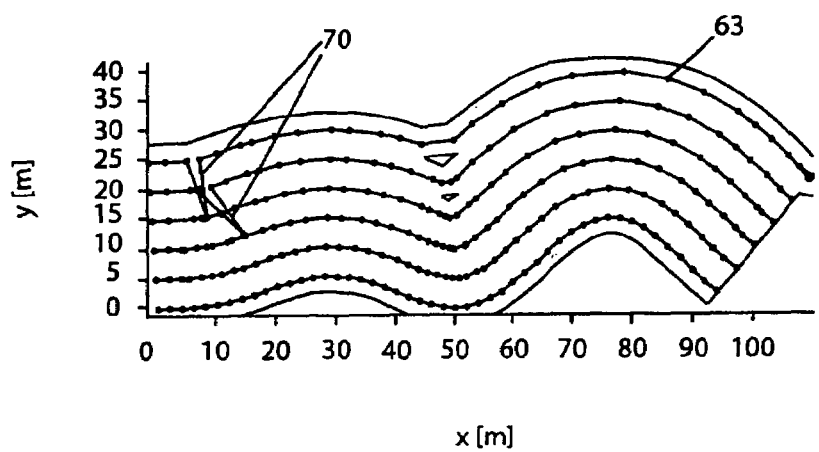
FIG. 14b is an illustration of the field and paths of FIG. 14a modified to show the effect of GPS measurement noise.
Figure 14C:
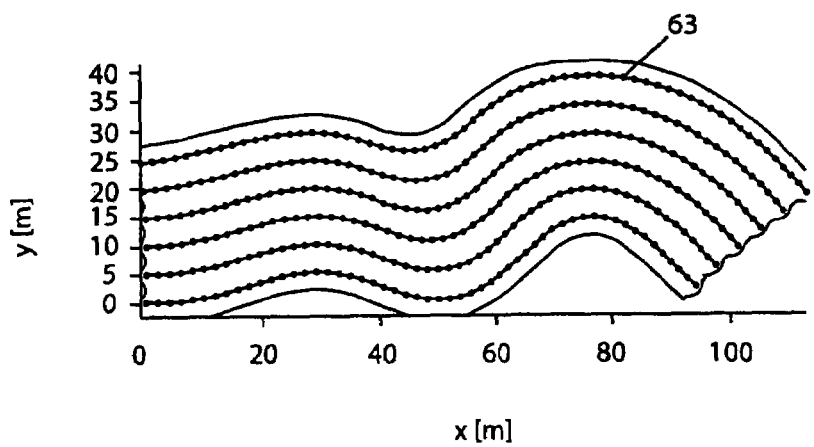
FIG. 14c is an illustration of the field and paths of FIG. 14b modified to smooth the curves with spatial filtering and to condition the data-point spacing before and after each propagation.

FIG. 14a is a duplicate of FIG. 13b, but aligned with FIGS. 14b and 14c to illustrate the effects of noise and to illustrate the spatial filtering that is used in one aspect of the present invention to overcome the effects of the noise. FIG. 14b illustrates the same propagation as in FIG. 14a, but with random noise added to the data points to simulate GPS measurement noise. Careful inspection of the first three or four paths in the sequence shows that propagation amplifies the noise. In practice the amplified noise can be felt as jerkiness in the steered vehicle and seen as kinks in the rows it lays down. Eventually the noise leads to outliers and errors 70 in the propagation, which must be removed before a path can be auto-steered. Also, note that, as mentioned previously, propagation changes the spacing of the data points on subsequent paths, i.e., with upwardly concave curves the spacing decreases and it increases with the propagation of downwardly concave curves.

FIG. 14c illustrates the same piecewise perpendicular propagation, again with noise, but this time the curves are smoothed by spatial filtering and the data-point spacing is conditioned before and after each propagation. In this implementation, the conditioning sets the data points so they have even spacing. This results in a much improved propagation, and much improved steering control and results in the field.

The following steps are taken according to an embodiment of the present invention in order to propagate an existing path:

1. Beginning with the existing points 1 ... n, which define an existing path and which were recorded by the system during the vehicle's movement over that path, the recorded data points are spatially low-pass filtered to reduce noise and to ensure equal spacing between the points along the path. In an alternative embodiment, spacing can be implemented that varies with the curvature of the path.

2. Given that the original sense of the path is defined by the sequence in which the points were laid down or recorded, the propagation direction is then defined as left or right with respect to the original sense of the path.

3. A perpendicular offset is next projected at each point in sequence along the path in the propagation direction.

4. The offset path is then pruned to remove possible loops and reversals caused by high curvature and/or noise in the original path.

5. The offset path is finally spatially low-pass filtered to reduce noise caused by propagation.

As mentioned in the example, in a preferred embodiment the system has the ability to propagate by more than one offset width from an existing path. In fact, in this embodiment, the system can propagate by an integral number of path widths from any given path. This is achieved by propagating one offset width as described above, storing the newly generated path, performing another propagation on the stored path, and repeating as many times as necessary. The number of propagations that the system is prepared to make is a user specifiable parameter. By default in this embodiment the system will attempt to propagate the nearest existing path in the direction of the current vehicle location until it calculates a path that satisfies the property that the maximum perpendicular distance from the current vehicle location to the calculated path is less than half the propagation width. This path will be suggested as the next path to be followed.

The initial n points are measurements taken from the GPS system as the vehicle travels the path. They will be approximately evenly spaced at a spacing determined by a spacing parameter which can be specified by the user (typically in the range 1-3 meters, but in some cases larger spacing is acceptable). After step 1 (the low-pass spatial filtering), the points will be evenly spaced. However, after step 3, the points on the propagated line will be unevenly spaced, because points on a concave section will become closer together, while points on a convex section will become further apart (this should be clear from the nature of the perpendicular offset). On tight concave sections the propagated points may even reverse, causing reversals and loops (this depends on the curvature, the projection distance, and possible noise on the data). Before creating the signal to steer the vehicle, these reversals/loops should be removed (Step 4), and the data points are again filtered to remove noise and to ensure equal spacing (Step 5).

While equal point spacing is used in the implementation described here, other implementations may require wider spacing on low curvature sections and closer spacing on high curvature sections. This can reduce the data required to define a path. However, even in such an implementation, the data will have to be filtered or otherwise conditioned to remove noise and to ensure appropriate spacing on each section.

Potential reversals and loops in the newly offset path are removed (step 4 above) by traversing the offset points in sequence and searching for large changes in the angle between successive line segments and for any line segments which intersect each other. Projected points which reverse or form loops are simply dropped from the newly offset path. Any kinks or noise introduced by dropping such points will be removed by the subsequent spatial filtering step.

The algorithm for spatially smoothing the path data points can be implemented in a variety of ways. As noted above, the data points are smoothed primarily to reduce the effect of sensor noise. This sensor noise can cause errors in the path to be followed, causing "jerkiness" in steering when the vehicle is following the data points. Even if the sensor noise in not significant, the noise can become more and more exaggerated when noisy data is perpendicularly propagated.

The preferred embodiment of this aspect of the invention uses a smoothing algorithm based on windowed polynomial fits to the data points, but alternative embodiments can be used to accomplish the necessary smoothing. For example, the GPS position data can be filtered using a time-based low-pass filter (well known to those skilled in the art) as they are collected. A disadvantage of time-based filtering is that it typically assumes a constant velocity as the vehicle moves down the path. However, in cases where this assumption is valid, time-based filtering may provide appropriate smoothing.

The preferred means for spatial filtering (i.e. path smoothing), as described here, is an algorithm that also has the added benefit that it can be used to ensure a desired spacing between smoothed data points, set the minimum and maximum values allowable for this spacing, and adjust the severity of the smoothing. While the embodiment described here ensures approximately equal spacing between the points, as has been stated, a similar algorithm may adjust the spacing according to the curvature of the path being smoothed.

The algorithm begins with a 2-dimensional set of n input data points representing the positions of points along the path. These points are represented by the vectors $x_0$ and $y_0$ in this example. In general, the algorithm can be extended to 3 or more dimensions without loss of generality. The algorithm also begins with parameters for the minimum and maximum spacing allowed between the output data points, the order of the polynomial function used to filter the data, and the size of the window used to filter the data. The output of the algorithm is a 2-dimensional set of output data points which are represented by the vectors $x_1$ and $y_1$.

In the algorithm, a third vector $s_0$ is generated which accumulates the linear distance between each point, as computed using the Pythagorean Theorem:

$$s_0(1)=0$$

$$s_0(i+1)=s_0(i)+\sqrt{(x_0(i+1)-x_0(i))^2+(y_0(i+1)-y_0(i))^2}$$

In this way, each data point $\{x_0(i), y_0(i)\}$ can be associated with its approximate distance along the overall path $s_0(i)$. The approximate overall path length is represented by $s_0(n)$.

Next, a new vector $s_1$ is created that contains numbers that are linearly spaced between 0 and the approximate overall path length. The vector $s_1$ nominally has the same number of points as $s_0$, but can contain more points or fewer points as necessary to ensure that the approximate spacing between points is between the minimum and maximum allowable values.

Finally, vectors $x_1$ and $y_1$ are created which are the same size as $s_1$, and the algorithm consecutively computes the values of the new data points $\{x_1(i), y_1(i)\}$ associated with each path length value $s_1(i)$ as follows:

a. An algorithm parameter called the "filter window" is used to determine how much of the original path $x_0,y_0$ is to be used in computing each new data point. For example, if the filter window is 10.0, and for a given value of i, $s_1(i)$ is 80.0, then all original data points $\{x_0(i), y_0(i)\}$ for which the corresponding value of $s_0(i)$ is between 75.0 and 85.0 are used in the calculation of $\{x_1(i), y_1(i)\}$. Making this filter window larger causes the algorithm to use a wider window of original data in computing each new data point, which generally makes the curve smoother. Let the subset of the points of $s_0$, $x_0$, and $y_0$ which fall inside the filter window around $s_1(i)$ for a given value of i be $s_{fi}$, $x_{fi}$, and $y_{fi}$.

b. For each value of i, $s_{fi}$, $x_{fi}$, and $y_{fi}$ are used to compute the new data point. A variety of processes could be used to perform this step of the algorithm. For this embodiment, a polynomial fit is used. Polynomial fits are well understood to one skilled in the art, and are not the subject of this invention. The "filter order" of this polynomial fit is a parameter of the algorithm. Two polynomial functions, $p_x$ and $p_y$, are computed to optimally fit the points $s_{fi}$, $x_{fi}$, and $y_{fi}$, i.e. such that: $p_x(s_{fi}(i)) \approx x_{fi}(i)$ and $p_y(s_{fi}(i)) \approx y_{fi}(i)$ for all i in the filter window.

c. The filtered values $x_1(i)$ and $y_1(i)$, are then given by $p_x(s_1(i))$ and $p_y(s_1(i))$, respectively.

Based on the above description of path smoothing by polynomial fitting, it will be clear to those skilled in the art that, in alternate embodiments, further smoothing can be achieved by fitting an interpolating spline through the points making up a path, and guiding the vehicle along the spline, instead of along the piecewise segments making up the path. Various spline techniques, such as cubic splines and B-splines may be used for this purpose. Spline techniques are well known to those skilled in the art, and are not the subject of this invention.

When this is done for every point in the si vector, the newly computed vectors $x_1$ and $y_1$ approximate the original path described by $x_0$ and $y_0$. The new path is smoothed, however, and the new points are approximately the same distance apart.

It should be noted that the system treats each path in its memory as a potential source for propagation, and handles each such propagation as described above. It is in this sense that this embodiment of one aspect of the invention is directed to a system for the propagation of adjacent paths so as to substantially cover an area. Given that the system can handle and propagate multiple paths of different shape, it can be used to cover an area with an arbitrary pattern of sequences of adjacent paths.

It should be clear that the system is a semi-autonomous tool, and that working a field is therefore an interactive process involving both the operator and the system. Accordingly, the user interface is a component of some aspects of various embodiments of the invention. In the present embodiment, the system has two primary user interfaces, i.e., moving the vehicle by steering and the graphical user interface or display screen. In particular, if the vehicle is steered away from the path, the system infers and predicts the intentions of the user based on the position and heading of the vehicle. For example, based on the position and heading, the system will select a nearby path as the most likely source for propagation, and calculate and display a proposed subsequent path based on this source path. Therefore, moving the vehicle (using the standard vehicle controls such as steering wheel, gears, throttle, etc.) is an important interface between the user and the system.

The system is provided with a display and a pointing device (a touch screen in the present embodiment, but clearly other pointing devices such as a mouse may be used). Therefore, the display is a graphical user interface between the system and the user, and throughout the operation of the system, various buttons and icons are displayed through which the user can interact with the system.

Although, the present embodiment uses the above interfaces, the possibility of supplementing these with other interfaces, such as voice activation, a keyboard, dedicated buttons or switches for common operations, will be clear to those skilled in the art.

An exemplary embodiment of the system has two modes, a row-selection mode and an automatic steering mode. In the row-selection mode, the operator drives and steers the vehicle manually, e.g. the system would be in this mode when the operator is driving and recording the first path in a series of adjacent paths. Moreover, when in the row-selection mode, the system continually attempts to find the closest path to the current vehicle position and heading from the set of all recorded paths in memory, and to propagate that path in the direction of the current vehicle position until it calculates a path that satisfies the property that the maximum perpendicular distance from the current vehicle location to the calculated path is less than half the propagation width. The path thus calculated is then displayed as the next path to be followed.

Figure 15:
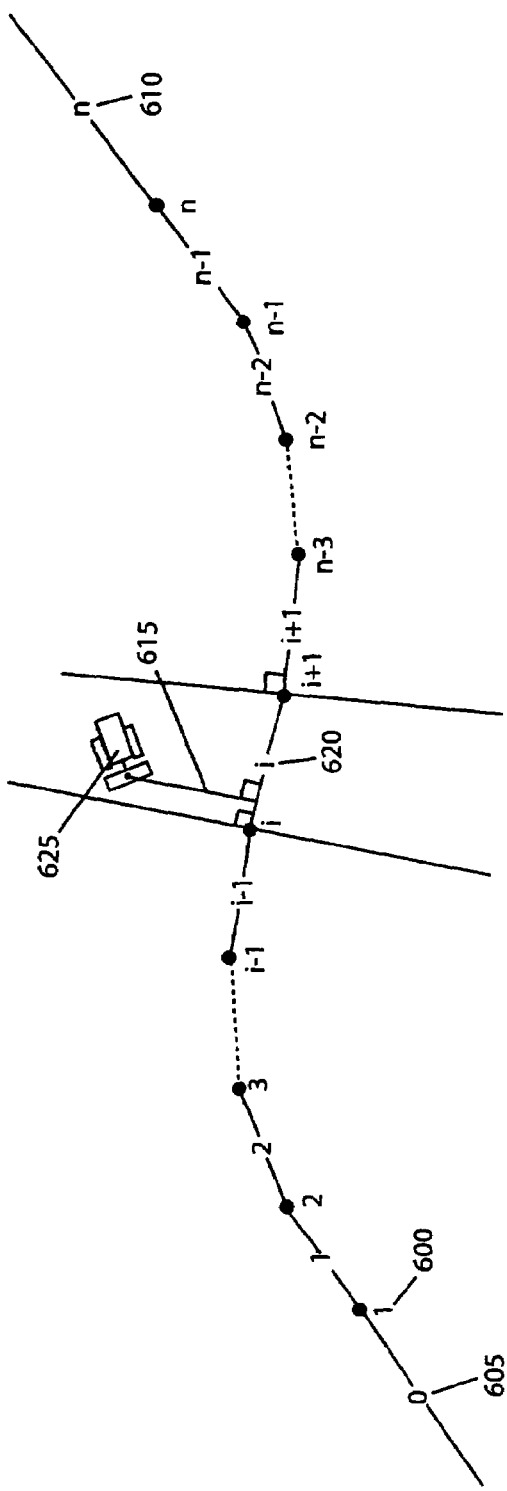
FIG. 15 is an illustration of the definition of the "current" segment of a path and the perpendicular distance from the vehicle to the path

The perpendicular distance to a path (existing or propagated) is defined as shown in FIG. 15. Given a set of n points, 1 . . . n, defining a path, define the $i^{th}$ line segment 620 as the segment joining the $i^{th}$ and $(i+1)^{th}$ points, as was done with respect to FIG. 12. Further define a $0^{th}$ segment 605 as the segment extending back to infinity beyond the $1^{st}$ point and parallel to the $1^{st}$ segment. Also, define an $n^{th}$ segment 610 as the segment extending to infinity beyond the $n^{th}$ point parallel to the $(n-1)^{th}$ segment. Then, given the position of the vehicle 625 relative to the path, the current segment, j, is defined as the segment such that the vehicle lies between the extended perpendiculars to segment j at points j and (j+1). Note if the vehicle lies beyond the ends of the path, the current segment will be either the $0^{th}$ or the $n^{th}$ segments. The perpendicular distance to the path is then defined as the perpendicular distance 615 from the vehicle to the current segment.

The closest existing path to the vehicle at any instant is calculated according to the following algorithm:

a. The system calculates the perpendicular distance to all the nearby paths.

b. All paths whose perpendicular distance is less than a specified distance (typically 5 times the propagation distance) are considered potential candidates for the closest path.

c. For each of these candidate paths the system calculates the absolute value of the acute angle between the current vehicle heading and the current segment (note for each path there exists a current segment, and each segment will form an angle of less than or equal to 90 degrees with the heading direction).

d. For each candidate path the system then calculates a measure of closeness defined as a weighted sum of the perpendicular distance to the path and the absolute value of the acute angle between the current vehicle heading and the current segment on that path. The relative weight placed on the distances and angles is a user specifiable parameter (typically, with the perpendicular distance normalized with respect to the propagation width and the angles normalized with respect to 90 degrees, the normalized angles are weighted by 0.5 with respect to the normalized positions). This allows the operator to tune the system to be more or less sensitive to heading in selecting the source for propagation.

e. The closest path (and therefore the source for propagation) is defined as the path with the smallest measure of closeness.

Thus, when in the row-selection mode in an exemplary embodiment, the system continually tries to infer and predict the most likely path which the operator wishes to follow. It does this as explained above: by calculating a closest path based on a weighting function and propagating that path until a path is found whose perpendicular distance from the vehicle is less than half the propagation width. This path is then displayed to the user as the proposed subsequent path. The user may drive this path manually, or have the system drive it automatically by interacting through a user interface, such as by pressing the "Go" button 90. If the user turns over steering control to the system, the system enters automatic steering mode, in which the system no longer continually searches for a closest path. Instead the system simply steers the vehicle along the proposed path.

Of course, the system will not always correctly anticipate the intentions of the operator and may present proposed paths that are not the path desired by the operator. In this case, the operator can change or refuse the proposed path by at least two methods in the present embodiment (although it will be clear that other user interfaces may be envisaged):

As noted above, one way to select an alternative path is for the operator to move the vehicle to a different position and/or heading. While in row-selection mode the system continually recalculates (several times per second) the closest path and hence the proposed subsequent path based on this closest path. If the operator moves the vehicle to a different position or changes its heading, then the vehicle may be closer to the path which the operator actually wishes to propagate, and the system will propose an appropriate subsequent path. This method of input works well in most cases and is often a natural extension of the operator's intentions. See for example, FIG. 9a, where the operator is working on the right-hand series of adjacent paths. If he wishes to change and continue to work on the left-hand series, he has merely to drive the vehicle over to the left-hand series, and the system will begin propagating from that series because the paths in it are now the closest paths.

Although the above method works well, there are situations where this default behavior may not produce the desired subsequent path, and where moving the vehicle is not an appropriate option for resolving the ambiguity. Two such situations have been described above, namely the case of avoiding the rock obstacle, and the case where two or more series of adjacent paths converge. Clearly, as will be apparent to those skilled in the art, other examples are possible, such as other interruptions in the terrain from bodies of water or other topography variations, etc. In these cases, an input other than vehicle motion is required so that the operator can interact with the system and communicate his desired path. In one example this input is provided by the previously described "Other Row" button in the graphical user interface. Clearly though, other inputs such as voice activation, a physical button, etc. may be used. In the present implementation, the "Other Row" button causes the system to temporarily flag the current closest path as ineligible for propagation, and to use the next closest row. A further press of the "Other Row" button flags even this path as ineligible, and the third closest path is used. The cycle continues until all paths based on all nearby paths have been proposed. Then the system suggests that the operator drive a new path manually and record it. Finally, a further press of the "Other Row" button renders all paths eligible again, and the cycle repeats. While presently preferred embodiments have been described, it will be appreciated by one of ordinary skill in the art that other implementations and user inputs may be used to provide the same flexibility to the operator.

As described above, whereas skill is required in the initial layout of a pattern for covering a given field, during the course of typical farming operations it is often desirable to rework the field, following the same paths and patterns laid out during a previous operation. In one embodiment, this capability is implemented by, upon setting up the system for a given operation, giving the operator the option of beginning a pattern from scratch, or of repeating a previous pattern. If the operator chooses to repeat a previous pattern, then the paths from the previous pattern are loaded into the system memory as a template for the current operation. Any obstacles, such as rocks, trees, etc., which were marked during the original operation will also appear in the template. These previously driven paths are displayed in a manner which clearly distinguishes them from paths followed during the current operation (e.g. by using different colors, although other implementations can be envisaged).

The system then enters a repeat mode, where instead of attempting to offset and propagate paths recorded during the current operation, the system offers to guide or steer the vehicle along the paths in the template pattern. All other features work similarly though, for example:

a. As the operator drives the vehicle around the field, the system selects the most likely previous path that the operator now wishes to follow based on the current position and heading of the vehicle. Here again if ambiguities arise that cannot be resolved by moving the vehicle, the operator has access to the alternative inputs (e.g., but not limited in concept to, an "Other Row" button) described earlier. Thus the operator can drive to any location in the field and begin following the previous paths.

b. By pressing the "Go" button the operator can turn over steering to the system, which will enter automatic steering mode and steer the vehicle along the proposed path.

c. The record function of the system now allows the operator to record the paths followed during the current operation, and shows these paths in a manner which distinguishes them from paths in the template pattern. Thus the operator is able to see the progress made during the current operation in covering the area according to the template (FIG. 11).

While there have been shown, described, and pointed out fundamental novel features of the invention as applied to preferred embodiments thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method for guiding a vehicle along a series of paths, comprising the steps of:
   a. causing the vehicle to traverse a first path of varying curvature;
   b. providing positional information about the location of the vehicle at multiple locations along the first path of varying curvature;
   c. calculating proposed subsequent paths of varying curvature based on the positional information, including possible alternative paths, using piecewise perpendicular offsets at each of the multiple locations along the first path to compute the subsequent paths of varying curvature including the alternative paths, each offset extending in a direction substantially perpendicular to a local tangent to the first path at the associated one of the multiple locations;
   d. displaying the proposed subsequent paths including the alternative paths; and
   e. receiving user input to select at least one of the alternative paths as a second path.

2. The method as claimed in claim 1, wherein the multiple locations have one of varying spacing or even spacing.

3. The method as claimed in claim 1, wherein the positional information is provided with centimeter-level accuracy.

4. The method as claimed in claim 1 wherein the positional information is from a Real-time Kinematic Global Positioning Satellite system.

5. The method as claimed in claim 1 further including the step of automatically steering the vehicle along the calculated and selected paths until the area is covered.

6. The method as claimed in claim 1 further including the step of manually steering the vehicle along the displayed calculated and selected paths until the area is covered.

* * * * *